Patented Feb. 2, 1932

1,843,576

UNITED STATES PATENT OFFICE

RAYMOND R. McCLURE, OF PITTSBURGH, AND JOHN W. CHURCH, OF CARNEGIE, PENNSYLVANIA, ASSIGNORS TO PURE CALCIUM PRODUCTS COMPANY, OF PITTSBURGH, PENNSYLVANIA, A CORPORATION OF OHIO

FILLER AND REENFORCING PIGMENT FOR PLASTICS AND METHOD OF MAKING THE SAME

No Drawing.  Application filed April 24, 1929.  Serial No. 357,880.

This invention relates to material useful as reenforcing pigments and fillers for plastics. Although the invention is applicable to fillers and reenforcing pigments for use in plastics such, for example, as rayon products, phenolic and urea condensates; nitro-cellulose plastics; plastics such as putty and linoleum in which linseed oil, tung oil, China wood oil or other drying oils are employed; it is described herein specifically in connection with fillers and reenforcing pigments for rubber.

This application is related to the application of John W. Church and Harvey G. Elledge, Serial No. 328,308, filed December 24, 1928, for precipitated material and method of making the same. In that application there is described a method of making fillers for plastics in which the material is subjected to attrition. The attriting step there described may be employed in our process.

We have found that precipitated silica, when treated in accordance with our invention, is well adapted for use as a reenforcing pigment or a filler in rubber mixtures. We have found that there are two factors which strongly influence the use of material as reinforcing pigments in rubber mixes. These two factors are first, the size of the particles and second, the wetability of the particles. By "wetability" we mean that property which causes the particles of the pigment to be wet by rubber in such a way that a strong bond is formed between the particles and the rubber.

In order to obtain particles of silica of very small size, it was first attempted to add to a dilute solution of hydrochloric acid a dilute solution of sodium silicate in order to produce a colloidal solution of silicic acid to form a "sol" which sets to a gel. The gel was then heated and thereafter disintegrated and washed. It was found that this method of producing particles of precipitated silica did not always result in the particles being as small as desired.

In order to produce particles of silica of the desired size a dilute solution of colloidal silicic acid was sprayed into a heated current of air and the flow of air was regulated so that there was a sufficient time for the water to be driven off from the silicic acid, thereby resulting in small particles of suspended silica. The dilute solution of silicic acid was prepared by diluting 855 cc. of commercial 40° Baumé sodium silicate with 3500 cc. of water, and then adding it with constant stirring to a solution of 320 cc. of concentrated C. P. hydrochloric acid in 4700 cc. of water.

The particles of powder suspended in air were led off through a pipe of restricted diameter where the flow was fast enough to keep the material in suspension, and the suspended particles were separated from the air by a dust collecting device.

This process of spray drying, employed to produce particles of silica of very small size, took care of one of the factors necessary in producing a suitable reenforcing pigment. The particles from the spray drier were ground wet in a pebble mill and washed with a large volume of water in order to remove the sodium chloride and other impurities which might be present. The washed material was filtered, dried and then attrited in a ball mill. The charge of material was about 150 grams and was introduced into a porcelain ball mill of about 6 inches diameter and 6 inches length. The mill contained a charge of about 10 pounds of steel balls of about ½ inch diameter. The attriting was carried on for about 16 hours. The mill was rotated at a speed of about 55 revolutions per minute. The material coming from the ball mill was then used in a rubber mixture of approximately the following composition:

| | Parts by weight |
|---|---|
| Smoked sheets | 93 |
| Zinc oxide | 5 |
| Sulphur | 3½ |
| D. P. G. | 1 |
| Silica | 40 |

This mixture when milled and vulcanized in accordance with best practice showed an ultimate tensile strength of 3635 pounds per square inch and an elongation of 607%. In this example the material was cured for approximately 45 minutes at a temperature of about 140° C.

The particle size and the "wetability" of the pigment greatly influence its effect as fillers or reenforcing pigments in plastics. This is shown by the fact that a sample of precipitated silica made by precipitating the gel in accordance with usual practice, then disintegrating, washing and drying it, produced a rubber compound having an ultimate tensile strength of 797 pounds per square inch when cured for about 120 minutes at a temperature of 140° C., when used in the same proportions as the spray dried and attrited silica given in the above example. A sample of the same material ground for about 16 hours in a mill of the type above described when compounded with rubber having a composition similar to that described in the above example showed a tensile strength of 2255 pounds per square inch when cured at a temperature of about 140° C. for approximately 120 minutes.

A sample of spray dried silica which was not attrited to change its "wetability" gave a tensile strength of about 2500 pounds per square inch when cured for about 60 minutes at 140° C. A sample of the same spray dried material which was ground in a ball mill in order to increase its "wetability" gave a rubber having an ultimate tensile strength of about 3635 pounds when cured for about 45 minutes at a temperature of approximately 140° C.

In the above examples, the curing temperatures and the time of cure were the optimum conditions for the particular mixes. Any differences in the physical characteristics of the product were due, therefore, to the manner in which the silica was treated before curing the rubber mixture. That is, the increase in desirable physical characteristics, was due to the change of particle size and to their increased wetability.

It will be understood from what has been stated that the utility of precipitated silica as a filler or reenforcing pigment for plastics depends both upon the size of the particles and their "wetability". According to our invention particles of a sufficiently small size are obtained by the step of spray drying. In order to increase the "wetability" of the spray dried particles of silica, they are subjected to attrition. The exact effect of the attrition on the silica particles is not definitely known. It is known, however, that the increased wetability is not due to grinding the particles to a substantially smaller size. The size of the particles, both before and after attrition, is substantially the same. Some change in the particle does, however, take place as they are attrited. This change is believed to be one in which the electrical charges on the surface of the particles are influenced.

That there is some sort of a change in the electrical charges on the surfaces of the particles is indicated by the fact that attrited and unattrited particles of silica act differently toward a piece of electrically charged sealing wax which is brought near them. For example, if a piece of sealing wax is given an electrical charge by rubbing it on a piece of silk, and the charged sealing wax brought near unattrited precipitated silica, the silica acts dead toward the sealing wax. However, if an electrically charged piece of sealing wax is brought near attrited silica particles, it causes the particles to become active and jump around. Whatever the theory underlying the effect of attriting silica particles is, we do know that the attriting increases the wetability of the particles and thereby increases its desirable properties as a filler or reenforcing pigment for plastics.

In the method hereinabove described, particles of silica of very small size were produced by spraying a colloidal solution of silicic acid into a heated current of air to drive off the water and leave small particles of silica suspended in the air. The invention is not limited to spray drying solutions of silicic acid, however, as other suitable liquids may be used to produce silica in finely divided form. For example, a dilute solution of sodium silicate may be sprayed into an atmosphere of carbon dioxide at an elevated temperature to produce particles of silica and sodium carbonate. This method has the advantage that the sodium carbonate so produced is less harmful to rubber than the sodium chloride resulting from spraying a solution of silicic acid containing sodium chloride into a heated atmosphere.

Another advantage arising from our invention is that when the silica is spray dried, and thereafter attrited to increase its wetability, the time of cure of the rubber mixture is reduced. This is very important from an economic standpoint. For example, the optimum time of cure of the rubber mixture containing spray dried unatrited silica was 60 minutes, whereas the optimum time of cure of the mixture containing spray dried and attrited silica was 45 minutes. This is a reduction in time of cure of about 25%.

The attrition of the silica increases the ease with which it can be introduced into the rubber mixture. If it is attempted to introduce unattrited precipitated silica into a rubber mixture the material tends to fly about and requires a greater number of passes through the mill in contact with the rubber to thoroughly mix it. In mixing the unattrited silica with the rubber, there is a tendency for the silica to fall off of the roll rather than to mix with the rubber. On the other hand, attrited silica, because of its increased wetability, can be introduced into the rubber mixture much more easily.

We have described in detail the present preferred method of practicing our invention. The invention, however, is not limited to the preferred method but may be otherwise practiced within the scope of the following claims.

We claim:—

1. The process of making silica adapted for use as a reenforcing pigment or filler for rubber plastics and plastics containing drying oils, which comprises spray-drying a suitable liquid to produce finely divided silica, and then subjecting the silica to prolonged attrition while maintaining the size of the particles substantially constant.

2. The process of making silica adapted for use as a reenforcing pigment or filler for rubber plastics and plastics containing drying oils, which comprises spray-drying a colloidal solution of silicic acid to produce finely divided silica, and then subjecting the silica to prolonged attrition to increase its wetability by the plastic while maintaining the size of the particles substantially constant.

3. The process of increasing the reenforcing effect of spray-dried silica for use in rubber plastic and plastics containing drying oils, which comprises increasing its wetability by subjecting it to attrition for a time sufficient to materially change the surface conditions of the particles without, however, substantially decreasing the size of the particles.

4. The process of making silica adapted for use as a reenforcing pigment or filler for rubber plastics and plastics containing drying oils, which comprises spray-drying a colloidal solution of silicic acid to produce finely divided particles of silica of such size that they are not substantially reduced in size when subsequently subjected to attrition, and thereafter subjecting the particles to attrition for a time sufficient to materially change their surface conditions without substantially decreasing their particle size.

5. Silica prepared by spray-drying a colloidal solution of silicic acid and thereafter subjecting the fine particles to attrition for a time sufficient to materially change the surface conditions of the particles without, however, substantially decreasing the size of the particles, the silica having the property of imparting greater tensile strength to a rubber mixture when vulcanized than an equal quantity of precipitated silica which has not been subjected to attrition.

In testimony whereof we have hereunto set our hands.

RAYMOND R. McCLURE.
JOHN W. CHURCH.